US00RE36707E

United States Patent [19]

Papanicolaou et al.

[11] E Patent Number: Re. 36,707

[45] **Reissued Date of Patent: *May 23, 2000**

[54] VIDEO TELEPHONY DIALING

[75] Inventors: Andreas Constantine Papanicolaou, Rumson, N.J.; Cheng D. Yu, Hsinchu, Taiwan

[73] Assignee: AT&T Corp, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/585,338

[22] Filed: Jan. 11, 1996

Related U.S. Patent Documents

Reissue of:

[64] Patent No.: 5,278,889
Issued: Jan. 11, 1994
Appl. No.: 07/921,862
Filed: Jul. 29, 1992

[51] Int. Cl.[7] ..... H04M 11/00

[52] U.S. Cl. ..... 348/14; 379/230

[58] Field of Search ..... 379/90.01, 93.01, 379/93.05–93.09, 93.11, 93.14, 93.32, 93.34, 93.37, 110.01, 201, 216, 219, 229, 230, 242; 348/14–19

[56] References Cited

U.S. PATENT DOCUMENTS

| | | | |
|---|---|---|---|
| 4,386,365 | 5/1983 | Gargini . | |
| 4,654,866 | 3/1987 | Bottle et al. | 379/54 |
| 4,893,326 | 1/1990 | Duran et al. . | |
| 5,343,240 | 8/1994 | Yu | 348/14 |

FOREIGN PATENT DOCUMENTS 0493896 7/1992 European Pat. Off. .

OTHER PUBLICATIONS

"First Results from Life Operation of the Biarritz Broadband Multiservice Network", Philippe Touyarot et al, International Switching Symposium, Mar. 17, 1987, Proceedings, vol. 2, pp. 229–233.

Kobayashi, Y. et al., "Development and Trial Operation of Video Teleconference System," *IEEE Global Telecommunications Conference,* Globecom '91, vol. 3, pp. 2059–2063, Dec. 5, 1991, Phoenix Arizona.

European Search Report for European Application No. 93305785.3 dated Apr. 23, 1997.

Paul Hurly et al, *The Videotex and Teletext Handbook,* pp. 216–218 & 388, ©1985.

*Primary Examiner*—Wing F. Chan

[57] ABSTRACT

In a video telephony system, a coaxial cable network, which is preferably a part of an existing cable television system, provides a local link for the transmission of the video telephone signals between each originating and destination location and a respective "head end" located on the cable company premises. Each of the head ends is connected to a "point of presence" of a telephone interexchange carrier so that a connection between pairs of head ends, and thus between a pair of video telephone locations, can be made via a switched digital network maintained by the carrier. Certain of originating and destination locations comprise a standard television set, serving as the audio/video display, and a consumer-type camera or camcorder, serving as the audio/video source. Others of the originating and destination locations comprise ISDN video telephones which are connected to the various points of presence of the interexchange carrier via local exchange carrier telephone networks. The video telephone numbers for cable subscriber locations are administered to be the same as the standard ten- (i.e., area code plus seven-) digit telephone numbers used for regular telephone calls directed to those locations.

8 Claims, 9 Drawing Sheets

*FIG. 9*

VIDEO NCP DATABASE

| | SUBSCRIBER VIDEO TELEPHONE NUMBER | CABLE SUBSCRIBER ROUTING INFORMATION | ISDN SUBSCRIBER RATE INFORMATION | OTHER FIELDS |
|---|---|---|---|---|
| 901 | 203-555-6721 | 162/127/126/108 | - - - | [ ] [ .... |
| 902 | 212-854-1754 | - - - | 384 | [ ] [ .... |
| 903 | 212-360-3513 | 161/122/121/XXX | 128 | [ ] [ .... |
| | .... | .... | .... | .... |

VIDEO TELEPHONY DIALING

Matter enclosed in heavy brackets [ ] appears in the original patent but forms no part of this reissue specification; matter printed in italics indicates the additions made by reissue.

FIELD OF THE INVENTION

This invention relates generally to video telephony and, more specifically, to bidirectional transmission of voice and picture information among a large number of geographically distributed users.

BACKGROUND OF THE INVENTION

Because two-way video communications can give individuals the ability to communicate graphical information and to see facial expressions and gestures that cannot be conveyed by audio alone, much emphasis has been placed on commercial development of such systems. Indeed, video telephones that work with analog telephone lines have been demonstrated. However, due to the limited bandwidth of conventional telephone lines, and the consequent limitation on the amount of information that can be carried therethrough, commercial development has been limited to less-than-full-motion video presented on a small display.

In order to overcome the bandwidth limitation associated with video telephony transmitted over the analog telephone lines, video telephones more recently have been designed to work with digital telephone access lines, such as ISDN. However, at the present time, digital access facilities to consumer homes are not readily available.

Other systems use optical fiber directly linked to subscriber homes in order to obtain the high bandwidth needed for full motion video. However, these facilities are expensive, and thus are not accessible to the ordinary household. Besides, it will be decades before most homes are provided with fiber access.

The above-outlined problems are substantially ameliorated by the arrangement disclosed in the co-pending, commonly assigned U.S. patent application of C. D. Yu entitled "Bidirectional Video Telephony Using Shared Channels on Coaxial Cable Networks," Ser. No. 787,436, filed Nov. 4, 1991. In a disclosed embodiment of the Yu arrangement, the terminal equipment comprises a standard television set, serving as the audio/video display, and a consumer-type camera or camcorder, serving as the audio/video source. A coaxial cable network, which is preferably a part of an existing cable television system, provides a local access link for the transmission of the video telephone signals between each originating and destination location and a respective "head end" located on the cable company premises. A network interface unit, or NIU, at each location provides a control interface between the terminal equipment and the cable distribution network to deal with such "housekeeping" chores as allocation of upstream and downstream video telephone channels between the subscriber location and the head end, receiving of "dialing" information from the subscriber via a keypad associated with the NIU, etc. Each of the head ends is connected to a "point of presence" of a telephone common carrier—illustratively an interexchange carrier such as AT&T—so that a connection between pairs of head ends, and thus between a pair of video telephone locations, can be made via a switched network maintained by the carrier.

SUMMARY OF THE INVENTION

In accordance with the present invention, the usefulness of a cable-television-based video telephony system of the type just described is enhanced by administering the video telephone number for cable subscriber locations to be the same as the standard ten- (i.e., area code plus seven-) digit telephone number used for regular telephone calls directed to those locations. Thus the subscriber at an originating cable subscriber location will enter on the aforementioned NIU keypad the seven- or ten-digit telephone number associated with the conventional telephone set that is installed at the destination cable subscriber location. This is advantageous in that, apart from the fact that a cable-subscriber-originated video call, rather than a conventional voice-only call, is being made, the subscriber at an originating cable location is given the illusion that he/she is initiating a dial-up connection similar to any other dial-up connection that proceeds exclusively through the telephone network, such as a simple voice-only call. That is, since the video telephone call is initiated to the same telephone number that would have been used if this were a conventional voice call made to the desired destination subscriber location, it appears to the originating subscriber that all he/she has done is "dial up" the desired destination subscriber from what appears to be nothing more or less than a video-capable "extension" telephone within the originating location. Additionally, subscribers can "give out" a single telephone number to friends and other potential callers, not having to differentiate between "my voice number" and "my video number" but yet still being able to receive both kinds of calls directed to that same telephone number.

BRIEF DESCRIPTION OF THE DRAWING

The present invention will be more fully appreciated by consideration of the following detailed description, when read in light of the accompanying drawing in which:

FIG. 9 depicts a portion of a database maintained within a video network control point (NCP) that is within the system of FIG. 1, showing the administration of video telephone numbers in accordance with the principles of the present invention.

DETAILED DESCRIPTION

Figure 1:
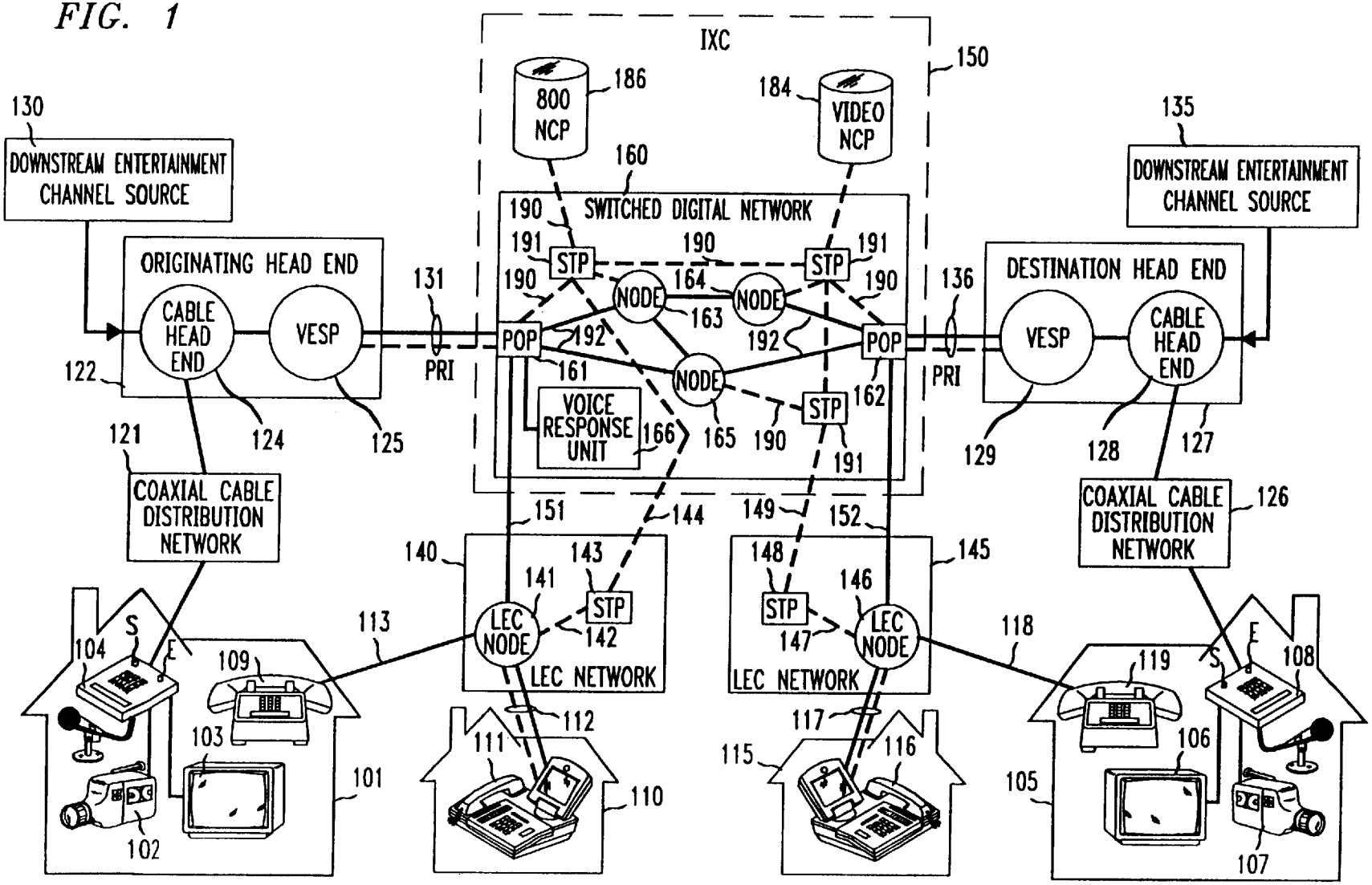
FIG. 1 is a block diagram illustrating a video telephony system of the type in which the present invention may be used.

The block diagram of FIG. 1 shows a video telphony system similar to that disclosed in the above-cited Yu patent application. In particular, an originating cable subscriber location 101 is shown to be able to communicate to a selected destination cable subscriber location 105 in a video telephone call established via a switched digital telecommunications network 160, the latter being part of an interexchange carrier (IXC) network 150. Cable subscriber locations 101 and 105 are illustratively private residences, although they need not be. The gateways to network 160 are point of presence (POP) locations 161, 162, which are described in more detail below.

Originating and destination cable subscriber locations 101 and 105 are connected to POPs 161 and 162, respectively, via connections which include respective connections through cable television distribution networks 121 and 126. In particular, audio and video communication between a network interface unit (NIU) 104 (described in more detail in connection with FIGS. 2 and 6) positioned within originating cable subscriber location 101 and originating head end 122 (located on cable company premises) uses coaxial cable television distribution network 121, which includes a series of bidirectional (i.e., forward and reverse direction) amplifiers. Such amplifiers are currently available in three bandwidth split categories from sources such as Scientific Adanta, Jerrold and Magnavox. Within head end 122, cable head end 124 filters and separates the received signal so that only the portion of RF bandwidth that is dedicated to video telephony is demodulated and applied to a video enhanced services platform, or VESP, 125 within originating head end 122. The portion of the RF bandwidth that is used for "entertainment channels" received from downstream entertainment channel source 130 is modulated by existing head end equipment and applied to existing cable system facilities that form no part of the present invention. Cable head end 124 and VESP 125 can be physically located at the same or different locations.

Other cable subscriber locations (not shown) have similar associated connections to head end 122 via coaxial cable television distribution network 121 in a tributary type structure and receive the same signals that are in effect "broadcast" on coaxial network 121.

Typically, the RF spectrum between 5 MHz and 30 MHz on cable network 121 is reserved for upstream use. Accordingly, four 6 MHz channels can simultaneously carry upstream analog audio and video signals in NTSC format. However, the coaxial bandwidth can be split in other ways for upstream and downstream use, so that a different number of upstream channels may be available for either upstream video telephone signals or entertainment signals. For example, digital video compression technology has made possible packing several (e.g., 4) video signals in one 6 MHz bandwidth. Throughout this specification, analog video telephone channels will be assumed to have a 6 MHz or less bandwidth. The capacity of digital channels will be denoted in terms of kilo bits per second.

In VESP 125, the demodulated audio and video signal is converted to a compressed digital signal, multiplexed with other digital signals, and sent to POP 161 as a 384 Kb/s composite signal via a digital communications channel 131, using an ISDN primary rate interface (PRI) connection along with other so-called DSI transmission facilities which are controlled by the D channel of the PRI connection using standard non-facility-associated signaling. (In the drawing, an ISDN connection is shown as a pair of lines—solid line representing the B channels and a dotted line representing the D channel.) The composite digital signal is then demultiplexed and one digital signal is transported from POP 161 to POP 162 via the digital switched telephone network, which may be AT&T's switched 384 Kb/s network.

After the end-to-end link between the originating and destination head ends is established, the digital audio/video signal is transmitted to destination POP 162. The digital signal received in POP 162 is multiplexed with other digital signals destined for the same destination cable network and the composite signal is transmitted to destination head end 127 via a digital communication channel 136 using an ISDN PRI connection. In a similar fashion to that just described, audio and video communication between head end 127 and destination location 105 uses the coaxial cable distribution network 126 serving destination location 105, which connects the cable head end 128 within destination head end 127 to a network interface unit 108 positioned within destination location 105. VESP 129 transforms digital signals back to analog audio and video signals, which are then modulated to specific RF carriers allocated for video telephony. Other locations (not shown) are tied into coaxial cable distribution network 126 in a tributary type structure, so that signals on cable distribution network 126 can represent video telephone information concurrently originating in or destined for several locations, as well as "entertainment channel" information provided by downstream entertainment channel source 135 and combined in analog head end 128. As with originating head end 122, the cable head end 128 and VESP 129 within destination head end 127 can be physically located at the same or different locations.

Before proceeding further, it may be observed at this point that, although the establishment of a connection between the originating and destination cable subscriber locations has been described as proceeding step-by-step from the former to the latter, other techniques for establishing the end-to-end connection may be used. One possibility is to proceed step-by-step in the opposite direction. Another is to establish connectivity from the destination location up to its associated VESP and then proceed step-by-step from the originating subscriber location to that VESP.

Within originating cable subscriber location 101 and destination cable subscriber location 105, audio and video signals are originated by cameras 102 and 107, respectively, and received and displayed on conventional television sets 103 and 106, respectively. These elements are connected to and interact with NIU 104 and 108, respectively, in a manner to be explained more fully below. It will be understood that any audio/video origination source (such as a camcorder or video tape player) can be used instead of cameras 102 and 107 and that any utilization device (such as a VCR) can be used instead of television sets 103 and 106. Also installed at cable subscriber locations 101 and 105 are conventional voice telephone sets 109 and 119, respectively, which have standard local loop connections 113 and 118 to nodes within respective local exchange carrier (LEC) networks 140 and 145 (described below) and between which conventional voice communication paths can be established through the IXC and/or LEC networks.

Switched digital network 160, as shown in FIG. 1, may include a single switch or a plurality of switches, including ISDN-capable switches within POPs 161 and 162 as well as other switches shown as "nodes" 163–165 in FIG. 1. The switches are interconnected by suitable transmission and signaling facilities, including trunks 192 and including standard common channel signaling, or CCS, facilities 190, that are themselves well known and form no part of the present invention. Suffice it to say that the digital network is arranged to route calls, which can be digitally encoded to represent audio and video information, as well as associated routing and control signals, to the appropriate destination. For the purposes of controlling network call flow, carrier 150 includes a number of network control points (NCPs), such as NCPs 184 and 186 discussed in more detail below. The network further includes so-called signal transfer points (ST? s) 191 which are interconnected with each other, with the NCPS, and with the various switching nodes via CCS signaling paths 190 shown as dashed lines.

Also shown in FIG. 1 are local exchange carrier (LEC) networks 140 and 145, which include LEC nodes such as nodes 141 and 146. Nodes 141 and 146 are ISDN-capable digital switches and have trunk connections 151 and 152 to POPs 161 and 162, respectively. Additionally, signaling lines 142 and 147 connect LEC nodes 141 and 146 to respective STPs 143 and 148. The latter, in turn, are connected to respective STPs 191 within network 160 via signaling lines 144 and 149. Such signaling interconnections between the LECs and interexchange carriers such as AT&T are not currently ubiquitous, but are required in order to provide ISDN capabilities such as 64 Kb/s transmission. Over time, it is expected that such signaling interconnections will, indeed, become ubiquitous or at least nearly so.

Also shown in FIG. 1 are originating ISDN subscriber location 110 and destination ISDN subscriber location 115. These, again, are illustratively private residences although they need not be. Subscriber locations 110 and 115 are connected to POPs 161 and 162 via other than a cable television distribution network—specifically, via respective telephone facilities. In particular, subscriber locations 110 and 115 are connected to LEC nodes 141 and 146, respectively, via ISDN BRI lines 112 and 117. These locations illustratively are outfitted with ISDN video telephones 111 and 116 which communicate video signals using CCITT Recommendations H.221 and H.261. The latter define an international video compression standard for digitization and compression of video signals at rates which are multiples of 64 Kb/s (i.e., 1×64 Kb/s up through 30×64 Kb/s). LEC nodes 141 and 146, in turn, respectively connect subscriber locations 110 and 115 to POPs 161 and 162 as already noted.

The overall combination of the ICX and LEC switched facilities—including those which provide both conventional and ISDN-based switched voice, video and other switched communications services—can be viewed as a single switched telecommunications network.

In accordance with the invention described in the commonly assigned U.S. patent application of W. P. Binns et al. entitled "Bidirectional Video Telephony," Ser. No. 07/921, 881, filed of even date herewith, the system of FIG. 1 is able to effect connections between any pair of subscriber locations, be they cable subscriber locations or ISDN subscriber locations. There are thus four cases to consider, because either one of the originating and the destination locations can be either a cable subscriber location or an ISDN subscriber location.

We will now consider each of these possibilities in turn.

Looking, first, at the ISDN-to-ISDN case, it will be appreciated that only some of the equipment described hereinabove will, in fact, be involved. Specifically, originating ISDN subscriber location 1 10 initiates a video telephone call to destination ISDN subscriber location 115 by dialing the telephone number associated with the latter, i.e., the telephone number assigned to BRI line 1 17. That telephone number may be thought of as an "address" identifying the destination location. Sine locations 1 10 and 115 are served by different LECS, the call is routed from LEC node 141 to interexchange carrier 150 and, more particularly, to POP 161 within switched digital network 160. POP 161 recognizes this as a video telephone call by virtue of unique signaling identifying the call as a video telephone call, that signaling being contained, initially, within the D channel of BRI connection 112 and, thereafter, within CCS messages forwarded to POP 161 from LEC node 141. Upon recognizing this as a video telephone call, network 160 needs to determine whether the destination location is an ISDN subscriber location or a cable subscriber location. To this end, POP 161 triggrs a query to video NCP 184, which includes a database which lists all of the video telephone cable subscriber locations. Specifically, a message which includes the dialed telephone number is forwarded to NCP 184 requesting a determination as to whether the destination location is or is not registered as a cable subscriber location. In this example, the destination location is, in fact, an ISDN subscriber location and, as a result, no database entry will be found. In this case, NCP 184—which, as noted above, knows the called telephone number—will instruct POP 161 to route the call to LEC node 146. From this point forward, the call proceeds like any other ISDN call. Specifically, POP 161 routes the call through network 160 to POP 162 in conventional fashion. The latter, in turn, forwards the call to LEC node 146 which completes the call to ISDN subscriber location 115.

Inasmuch as this turned out to be an ISDN-to-ISDN call, it will be appreciated that the call could have proceeded without an NCP lookup. That is, the call could, in theory, have been treated as a "standard" ISDN call which could have been routed, in the first instance, directly to the destination ISDN location. However, since it is not known a priori whether a call coming in to POP 161 is being made to a cable subscriber location or to an ISDN subscriber location, the lookup must be carried out in order to learn what type of equipment awaits at the destination location.

The second case is the cable-to-cable case (e.g., cable subscriber location 101 originating a call to destination cable subscriber location 105). In particular, the subscriber at originating cable subscriber location 101 initiates a call by pushing a START button, S, on NIU 104 (or on a remote control device which sends signals to NIITJ 104) in order to initiate a request signal that is equivalent to an off-hook message used in conventional telephony, that request signal indicating a desire to originate a video telephone call. This off-hook message is sent to VESP 125 when NIU 104 is polled thereby (by way of cable head end 124). As explained in more detail in conjunction with FIG. 3, VESP 125 includes a processor 360 (preferably a fault-tolerant minicomputer) and an associated database 361 which contains identity codes for the NIUs that are attached to cable distribution network 121 and which also keeps track of the upstream and downstream channel status on that network, administers scrambling codes, and performs other "housekeeping" tasks not here relevant.

The NIU constantly receives a signaling message from the VESP indicating the status of the channels over the coaxial cable distribution network 121 through a reserved portion of the bandwidth. Therefore, the NIU always knows if there are free channels available or not. When the subscriber initiates the call by pushing the START button, if there are no channels available, the NIU gives a busy signal to the subscriber. Otherwise, the NIU sends a message to the VESP to request a channel through a reserved portion of the bandwidth. If there were contention on this signaling channel, the NIU must re-transmit. (This scheme is similar to the well-known ALOHA system.) After reception of a clear message from the NIU by the VESP, the VESP transmits a message to NIU directing it to communicate on a particular pair of channels. After this time, all other signaling is done at the assigned channel. Then, the NIITJ is directed to transmit a signal representing the video telephone number of the desired destination location which was supplied by the subscriber via a dialing pad associated with the NIU along with information identifying the originating NIU to processor 360, which packages it into an ISDNPRI signaling message that is sent to POP 161.

Figure 10:
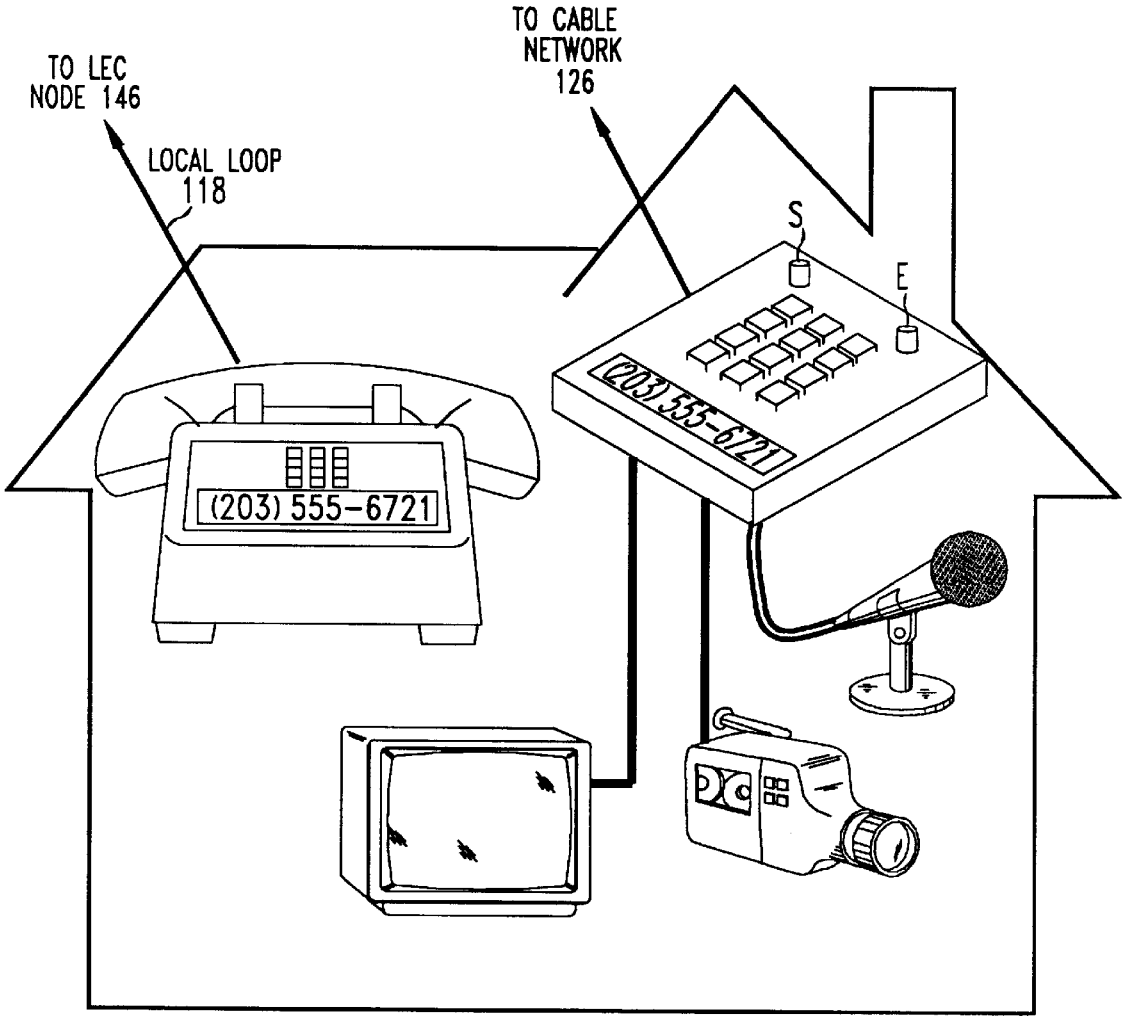
FIG. 10 is an enlarged view of one of the subscriber locations in the system of FIG. 1.

In accordance with the present invention, the video telephone number for a cable subscriber location—which, again, may be thought of as an "address" identifying same—is administered to be the same as the standard ten- (i.e., area code plus seven-) digit local exchange carrier telephone number used for regular voice telephone calls directed to that location. This may be seen from the enlarged view of destination cable subscriber location 105 in FIG. 10 showing that the local exchange carrier telephone number associated with local loop 118 and standard telephone set 119 is the same as the video telephone number associated with NIIJ 108. In this case, then, the subscriber at originating cable subscriber location 101 would have entered on the NIU's keypad the ten-digit telephone number associated with telephone set 119 installed at destination cable subscriber location 105, i.e., the telephone number assigned to local loop connection 1 1 8. This is advantageous in that, apart from the fact that a cable-subscriber-originated video call, rather than a conventional voice-only call, is being made, the subscriber at an originating cable location is given the illusion that he/she is initiating a dial-up connection similar to any other dial-up connection that proceeds exclusively through the telephone network, such as a simple voice-only call. That is, since the video telephone call is initiated to the same telephone number that would have been used if this were a conventional voice call made to the desired destination subscriber location, it appears to the originating subscriber that all he/she has done is "dial up" the desired destination subscriber from what appears to be nothing more or less than a videocapable "extension" telephone within the originating location. Additionally, subscribers can "give out" a single telephone number to friends and other potential callers, not having to differentiate between "my voice number" and "my video number" but yet still being able to receive both kinds of calls directed to that same telephone number.

At POP 161, the signaling information associated with the call—including, for example, the called video telephone number—obtained from VESP 125 is used to trigger a query to NCP 184 in the manner described above. Since in this case the called location is, in fact, a cable subscriber location, NCP 184 accordingly instructs POP 161 to route the call to VESP 129 via switched digital network 160.

The destination NIU 108 receives from cable head end 128 a) upstream and downstream channel assignments and b) appropriate descrambling codes, and it activates a ringer to inform the called subscriber at the location of an incoming video telephone call. After the called party pushes a START button (equivalent to "off-hook" in telephony), the incoming audio/video signals are fed to television set 106 and camera 107 sends its audio/video signals through the assigned upstream channel to the calling party's television.

After two-way communication has been established between locations 101 and 105, either location can terminate the call by activating an END button, E, at NIU 104 or 108, or at a remote control device which communicates with the NIUs. The END signal is transmitted in the upstream data communication channel to the attached head end (122 or 127), and interpreted in a manner equivalent to an on-hook signal in telephony, namely to instruct switched digital network 160 to terminate the video telephone call and tear down the connection therethrough.

The third case is the cable-to-ISDN case (e.g., cable subscriber location 101 originating a call to destination ISDN location 115). Such a call proceeds identically to the cable-to-cable case up through the query of NCP 184, this being a consequence of the fact that the equipment at the destination location (cable TV or ISDN) is not known until the database lookup has been effectuated. ISDN subscriber location 115 is not listed in database 134. Moreover, it may be assumed that an ISDN video telephone at a residence is not one which is capable of operating at 384 Kb/s, which is the rate at which signals are generated by VESP 125. Rather, 128 Kb/s is the most likely case. A video telephone signal at that lower speed must thus be supplied to destination ISDN location 115.

Typically, however, the node within POP 161 will not be capable of converting the call to a call at a lower speed (although it is possible to enhance the POP 161 and VESP 125 to provide this capability). Accordingly, NCP 184 will return a message to POP 161 instructing it to clear the call. The POP, in turn, will return a call-clearing message to VESP 125 in standard fashion.

The fact that the call was cleared at POP 161 will be taken by VESP 125 as an indication that the destination location is neither a cable subscriber nor a video telephone that can support a 384 Kb/s signal. As a result, the VESP will a) assume that the terminal equipment can only support a 128 Kb/s signal, b) will re-digitize the analog signal received from cable head end 124 at that lower rate, and c) will re-initiate a call to POP 161 at that rate. The messaging which accompanies the call request will be such as to inform POP 161 that no database query is required but that, rather, the call should be immediately routed over switched digital network 160 based on the destination telephone number supplied, thereby re-establishing the call at the lower rate. From this point, the call proceeds just as in the ISDN-to-ISDN case.

(As is well known, a 128 Kb/s connection is conventionally implemented by establishing two 64 Kb/s connections through the network, those connections being synchronized by the endpoint terminals. For convenience of exposition herein, reference to a digital connection, or call, should be understood to comprise such a pair of 64 Kb/s calls.)

The fourth case is the ISDN-to-cable case, e.g., ISDN subscriber location 110 originating a call to destination cable location 105. In particular, the call proceeds identically to the ISDN-to-ISDN case up through the query of NCP 184. Here, destination location 105 is, in fact, listed in the database as a cable subscriber location. Therefore, NCP 184 will return instructions to POP 161 to route the call to destination head end 127 through POP 162. From this point on, the call is like a cable-to-cable call except that the transmission rate is determined by the rate at which the call was established which, in turn, depends on the capabilities of ISDN originating location 110. VESP 129 is capable of handling calls at various rates and, in each case, of converting the received video telephone signals to the analog form required by destination cable subscriber location 105.

In the examples given above, it was tacitly assumed that the originating and destination parties are provided with telephone service in different so-called local access and transport areas, or LATAS. If they were in the same LATA, a call from ISDN location 1 10 to ISDN location 115 would have been handled without being routed through an interexchange carrier. Since both of those locations are ISDN locations, this is no problem. The call will be treated by the LEC as a standard intra-LATA ISDN call. A different situation arises, however, if the destination location is a cable subscriber but is still within the same LATA as the originating subscriber. In this case, the LEC will, in the first instance, interpret the call request as being a request to complete a call to an ISDN subscriber. Since the called subscriber does not have ISDN service, this call will simply fail at the destination LEC node.

One way to resolve this issue is for the LECs to provide connections to the VESPS, thereby in effect replicating, for local calls, the functionality of interexchange carrier 150, as described above. Assuming, however, that the LECs do not offer this capability, an alternative way of providing service in this case is to provide the ISDN subscriber locations with a mechanism for accessing interexchange carrier 150 directly. One such mechanism is to provide the ISDN subscriber with a telephone number which can be dialed to initiate an ISDN-to-cable connection.

More particularly, the call—which is assumed in this example to be an 800-type call—would begin from originating ISDN location 1 10 as a voice call, inasmuch as digital 800 service is not currently offered by interexchange carriers. By virtue of the number dialed, the call will be routed by LEC network 140 to POP 161 via trunk 15 1. POP 16 1, in turn, will request instructions for handling this call from 800 NCP 186. The latter determines from its associated 800 number database that this is, in fact, a video telephone call and instructs POP 161 to route the call temporarily to voice response unit 166 which may be, for example, a Conversant® voice response unit available from AT&T. Voice response unit 166 presents audio announcements to the originating subscriber requesting the telephone number of the destination location and, upon receiving same via touchpad input from the subscriber, establishes a new call to destination head end 12, through POP 161, by using the destination address provided by the subscriber. By virtue of the fact that this call is destined for VESP 129 rather than LEC node 146, POP 161 initiates a lookup to NCP 184 which in turn provides correct routing instructions to POP 161 for routing the call to head end 127. If an entry for the latter cannot be found in NCP 184, the caller is alerted by the voice response unit 166 that the call cannot be completed. Either the call is terminated at this point or the originating subscriber is given another opportunity to supply a valid destination telephone number.

Assuming, however, that an entry for the destination location—illustratively, location 105—found in NCP 184, then NCP 184 returns to POP 161 instructions to route the call to VESP 129 through POP 162. At this point, voice response unit 166 bridges the call received from the calling subscriber to the call itself initiated towards the called subscriber. This in effect gives the appearance to the calling subscriber of the second call as a progression of the first call. Since the current capabilities for 800-type calls are such that only voice calls can be supported, the call received by VESP 129 at this time is not a digital video telephone call, as was the case in the examples given above, but, rather, is a voice call. In order to establish a digital connection which can support video telephony, it is necessary for VESP 129 to initiate the setting up of a digital connection between itself and originating ISDN location 1 10. To this end, VESP 129 may deliver an audio message to originating ISDN location 1 10 instructing the originating subscriber to hang up and wait for a return digital call. VESP 129 first checks to ensure that the destination customer or the access channels to that customer are not busy. Provided that this is the case, VESP 129 thereupon uses the number which was supplied by POP 162 with the voice call to set up the call. With the call between the originating ISDN location 1 10 and destination head end 127 thus established, the latter can proceed to establish a link from itself to the destination cable subscriber location 105 in the same way that it would for any other incoming video telephone call. If, on the other hand, the destination customer is found to be busy, an appropriate announcement, e.g., busy tone, is provided to the calling subscriber.

The foregoing is merely illustrative and various enhancements are possible. For example, it was assumed hereinabove that in ISDN subscriber location will not be registered in NCP 184 and will have a specific type of video telephone, e.g., a video telephone which communicates at 128 Kb/s. It is possible, however, to maintain in that same database subscription information about ISDN subscriber locations, as well. Such information may include the data rate at which the subscriber's equipment operates so that different ISDN video telephones can be supported in a graceful way. The retrieval of such data by NCP 184 would result in explicit instructions being sent to VESP 125 through POP 161. The VESP, in turn, can use this information to initiate the setting up of a call at the appropriate rate for the destination ISDN subscriber location.

As a further enhancement, a cable subscriber location may also have an ISDN line so that the subscriber can a) use his/her ISDN (video telephone) if the other location also comprises an ISDN video telephone, or b) use his/her cable-connected equipment if the other location has that type of equipment. This can be easily accomplished by cross-referencing the incoming call type with the subscription data stored in NCP 184 and routing calls accordingly.

Another possible enhancement is the incorporation of the concept of a "teaming database." When data on a given called customer is not found in video NCP 184, calls at likely data rates can be made to see, by trial and error, which data rate indeed is appropriate for the called subscriber. This information can thereafter be stored in video NCP 184 so that subsequent calls to the subscriber can proceed automatically.

Figure 8:
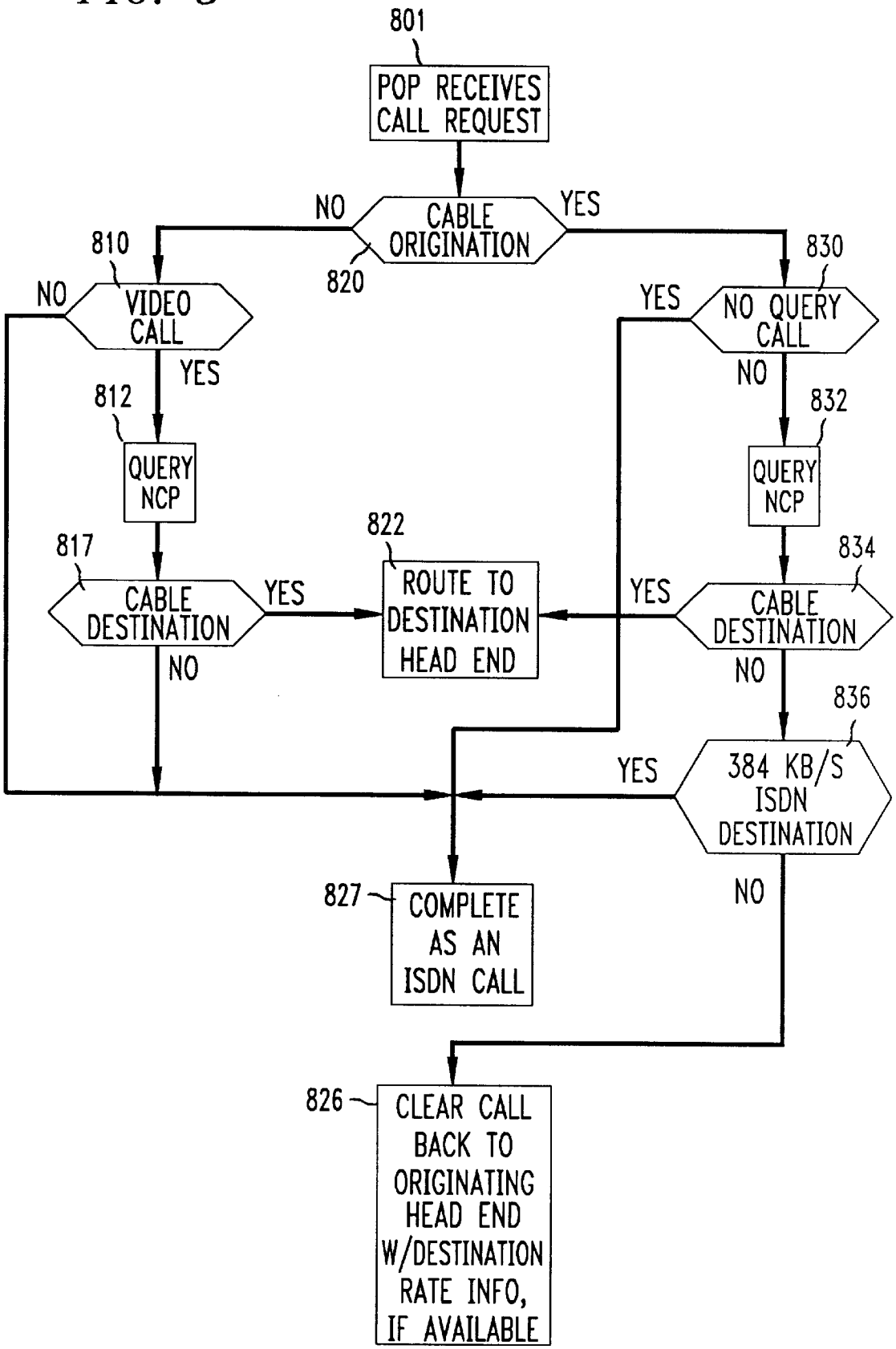
FIG. 8 is a flowchart setting forth the logical sequence of steps implemented within the system of FIG. 1 to achieve connections between different types of subscriber locations which are served by the system.

The logical sequence of steps implemented within network 160 to achieve the above-described various forms of connections is summarized by the flowchart of FIG. 8, beginning when POP 161 receives a call request at step 801. If the call was not originated from a cable head end, as is determined at step 820, it is assumed to be an ISDN call. It is then determined from the D channel at step 810 whether this is a video call, as opposed to any other type of ISDN call. If it is the latter, the ISDN call is simply completed in the conventional way, as indicated at step 824. If, on the other hand this is a video call, then NCP 184 is queried at step 812 to determine, as tested at step 814, whether the destination location is a cable subscriber location. If it is, the call is routed to the destination head end, as indicated at step 822, this being the ISDN-to-cable case. If, on the other hand, the destination location is a not a cable subscriber location (or, as mentioned above as a possibility, it is a subscriber location that has both cable and ISDN capabilities) the call can, again, be completed as a normal ISDN call, this being the ISDN-to-ISDN case.

Returning to step 820 and assuming, now, that the call was originated from a cable head end, a test is first made at step 830 as to whether this is a "no query," meaning a call that the originating head end indicates in call setup request that no query is needed for routing this call. If this is a "no query"

call, the call is completed as an ISDN call at step 824. As noted earlier, the bit rate for the "no query" call is either the default rate of 128 Kb/s or some other appropriate rate, if the originating head end has been given explicit bit rate information about the destination location from NCP 184 when the call was cleared. If this is not a "no query" call, NCP 832 is queried at step 832 and the nature of the destination location is tested at step 834. If the destination location is a cable subscriber location (or, as mentioned above as a possibility, it is a subscriber location that has both cable and ISDN capabilities), the call is routed to the destination head end as indicated at step 822. This is the cable-to-cable case. If the destination location is not a cable subscriber location it is presumed to be an ISDN location. Indeed, NCP 184 may contain information indicating that the destination location is capable of receiving 384 Kb/s video, in which case the signal from the originating head end, which is also a 384 Kb/s signal, can be immediately forwarded to the destination location as an ISDN call from that point, per steps 836 and 824. If NCP 184 does not indicate that the destination location is capable of receiving 384 Kb/s video—either because it has information indicating that the destination location operates at a lower speed or because it has no information about that location at all—the call is cleared back to the originating head end, as indicated at step 826, the call clearing message including the destination rate information if it is available.

FIG. 9 shows a small portion of the subscriber database maintained within video NCP 184. Three information fields of particular relevance to the invention—"subscriber video telephone number," "cable subscriber routing information," and "ISDN subscriber rate information"—are represented explicitly in the FIG., with other fields simply being denoted as such. These data elements can be entered through a "subscription-time" questionnaire or through the actions of a learning database, as alluded to earlier.

Three illustrative data records within the database are shown. Record 901 is a record for a subscriber location which is only a cable subscriber location. Indeed, it is the record for cable subscriber location 105. This record thus contains the subscriber video telephone number and cable subscriber routing information, but no ISDN subscriber rate information. The cable subscriber video telephone number is (203) 555-6721. As noted earlier and as shown in FIG. 10, this video telephone number is, "in accordance with the present invention, the same as the local exchange carrier telephone number associated with local loop 118 to which is attached standard telephone set 119 within the subscriber location. The cable subscriber routing information—retrieved when video NCP 184 is accessed using the subscriber video telephone number supplied thereto—is used to route video calls to the subscriber location including, for example, an identification of the destination POP, destination head end, and a code uniquely distinguishing the destination location from all others served by that head end, thereby establishing an association between the telephone number and the cable television distribution network associated with the destination cable subscriber location. In record 901, this routing information is symbolically represented as 162/127/126/108, which are the reference numerals for the various elements of the route to NW 108 within subscriber location 105.

Record 902 is a record for a subscriber location which is only an ISDN location—illustratively ISDN subscriber location 110. As such, the record contains a) a subscriber video telephone number which, in this case, identifies ISDN connection 112, and b) information about the rate at which the ISDN video telephone 111 installed at that location operates—symbolically represented in FIG. 9 by a "384", meaning 384 Kb/s. (It will, of course, be remembered that an ISDN destination location need not have an associated record in the NCP in order for it to receive calls. In the absence of such a record, a default rate of 128 Kb/s is assumed.)

Record 903 is a record for a subscriber location which is both a cable location and an ISDN location—illustratively one of the locations (not shown) connected to distribution network 121. Here all three of the fields have entries, including an entry indicating that the ISDN video telephone at that location operates at a rate of 128 Kb/s. (It will be recalled that, for such locations, calls would typically be directed to the cable (ISDN) equipment if the originating equipment is cable (ISDN) equipment.)

The reminder of this detailed description and the associated portions of the drawing describe and show details of the various components of the system of FIG. 1.

Figure 2:
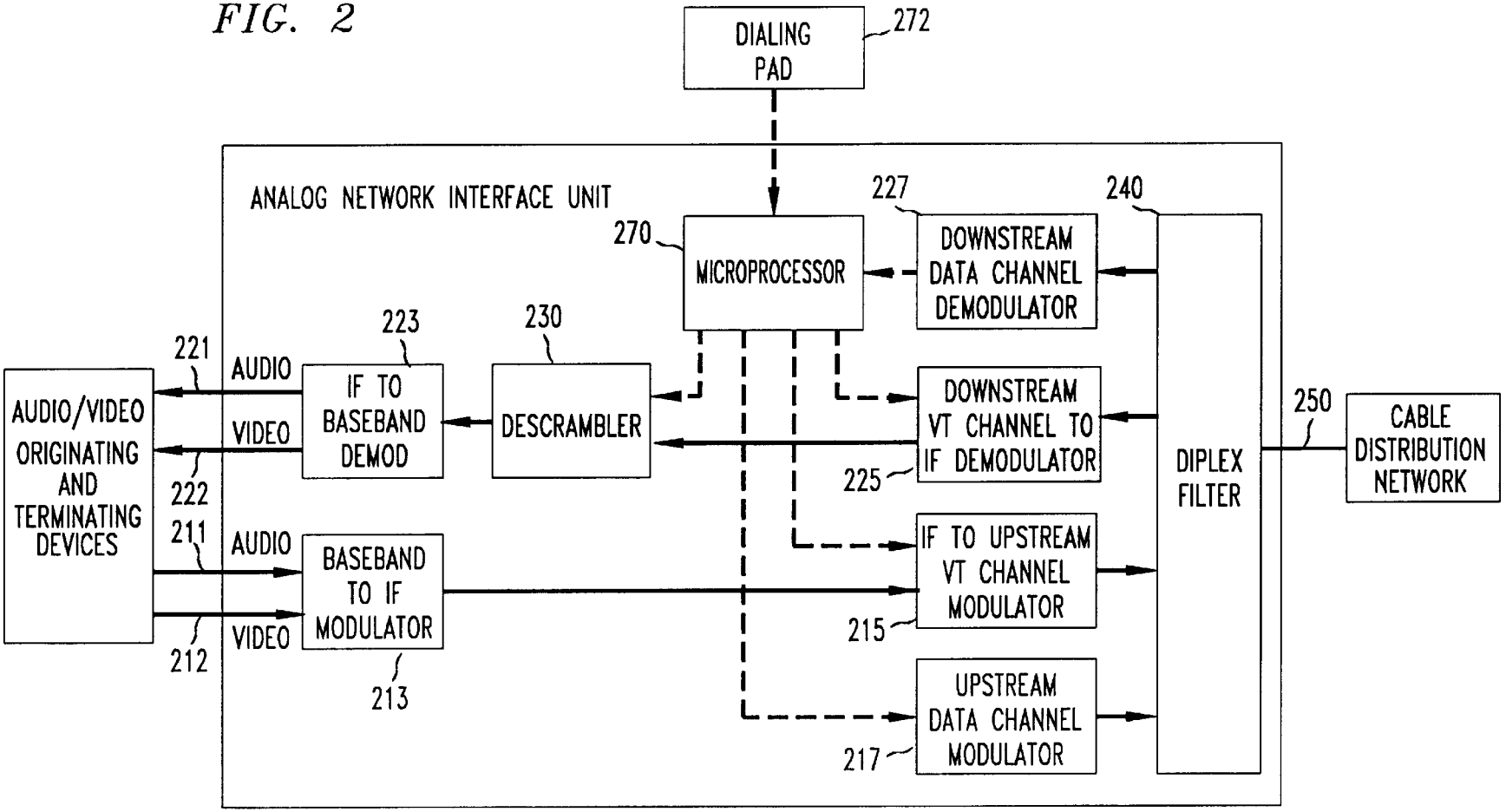
FIG. 2 is a block diagram of an analog network interface unit that can be used in the system of FIG. 1.
Figure 7:
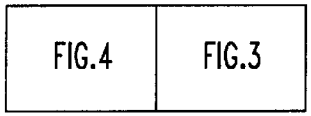
FIG. 7 shows the inter-relationship between FIG. 3 and FIG. 4.

Referring, in particular, now to FIG. 2, there is illustrated in block diagram form an analog network interface unit (such as NIU 104 or 108 in FIG. 1). This NIU is used in embodiments in which digital coding and decoding is not available in originating and destination locations. In this embodiment, audio and video signals generated in an originating location are provided to the NIU on individual inputs 211 and 212, respectively, while audio and video signals are output from the NIU on individual outputs 221 and 222, respectively. The NIU is connected to a cable distribution network through a coaxial cable 250, for the purpose of sending and receiving frequency modulated signals, typically in the 5–550 MHz frequency bend, via a diplex filter 240. The functions of filter 240 are: (1) to provide a high-frequency band pass (e.g., 50 to 550 MHz) between coaxial cable 250 and the downstream data channel demodulator 227 as well as the downstream video telephone channel to IF demodulator 225; (2) to provide a low-frequency band pass between coaxial cable 250 and the upstream data channel modulator 217 as well as the IF to upstream video telephone channel modulator 215. This capability exists in most two-way coaxial cable amplifiers. Within the NIU, a miroprocessor 270 receives information from dialing pad 272 and from downstream data channel demodulator 227, which demodulates the downstream data communication carrier frequency to retrieve control information sent from a VIESP. The downstream control information may include the following messages: (1) polling message; (2) upstream video telephone channel assignment message; (3) downstream video telephone channel assignment message; (4) descrambling authorization message; (5) Caller ID; and possibly other auxiliary information.

Video telephone signals generated in the originating location and destined for the destination location are processed in the NIU by modulating a carrier to form an RF signal illustratively having an approximate 6 MHz bandwidth. This is done so that several (illustratively four) upstream video telephone "channels" will exist on coaxial cable 250. Of course, other arrangements may utilize fewer or additional channels or channels of less than 6 MHz bandwidth. Modulation is accomplished in two stages, first to an intermediate (IF) frequency in baseband to IF modulator 213, and then to the desired channel frequency in IF to upstream video telephone channel modulator 215. The particular channel center frequency selected and used in modulator 215 is under the control of a microprocessor 270, through its interpretation of the upstream video telephone channel assignment message.

Incoming video telephone signals are processed in the NIU of FIG. 2 by tuning (frequency demodulating) the RF signal received on coaxial cable 250 to recover the embedded audio and video information. Demodulation is accomplished in two stages, first by a downstream video telephone channel to IF demodulator 225 and then by an intermediate frequency to baseband demodulator 223. The particular channel center frequency used in demodulator 225 is selected under the control of microprocessor 270 through its interpretation of the downstream video telephone channel assignment message received from the associated head end. In order to assure that only the desired party can receive and utilize the incoming audio/video information, the downstream signal is scrambled (in scramblers 371–373 in the destination side VESP, as explained more fully in FIG. 4). Descrambler 230 is arranged to descramble the scrambled IF signal output from demodulator 225, under the control of microprocessor 270 through its interpretation of the descrambling authorization message received from the associated head end.

Microprocessor 270 also receives inputs from the user of the NIU of FIG. 2, illustratively via keypad 272, in order to obtain information about each video telephone call, such as on-hook and off-hook status, dialed number, billing information, authorization number, and so on. This information is applied to a separate upstream data channel modulator 217, illustratively an FSK modulator, which converts the digital data to a modulated signal that is also transmitted via coaxial cable 250.

Before describing the remaining portions of the system, it will be instructive to describe here the arrangement of a digital NIU used in embodiments in which digital encoding and/or decoding is available in either an originating location, a destination location, or both. Such a digital NIU is illustrated in block diagram form in FIG. 6. In this figure, as in FIG. 2, analog audio and video signals generated in an originating location are provided to the NITJ on individual inputs 211 and 212, respectively, while analog audio and video signals are output from the NIU on individual outputs 221 and 222, respectively. As in FIG. 2, the digital NIU of FIG. 6 is connected to a cable distribution network through a coaxial cable 250, for the purpose of sending and receiving frequency modulated signals, typically in the 5–550 MHz frequency band, via diplex filter 240.

Figure 6:
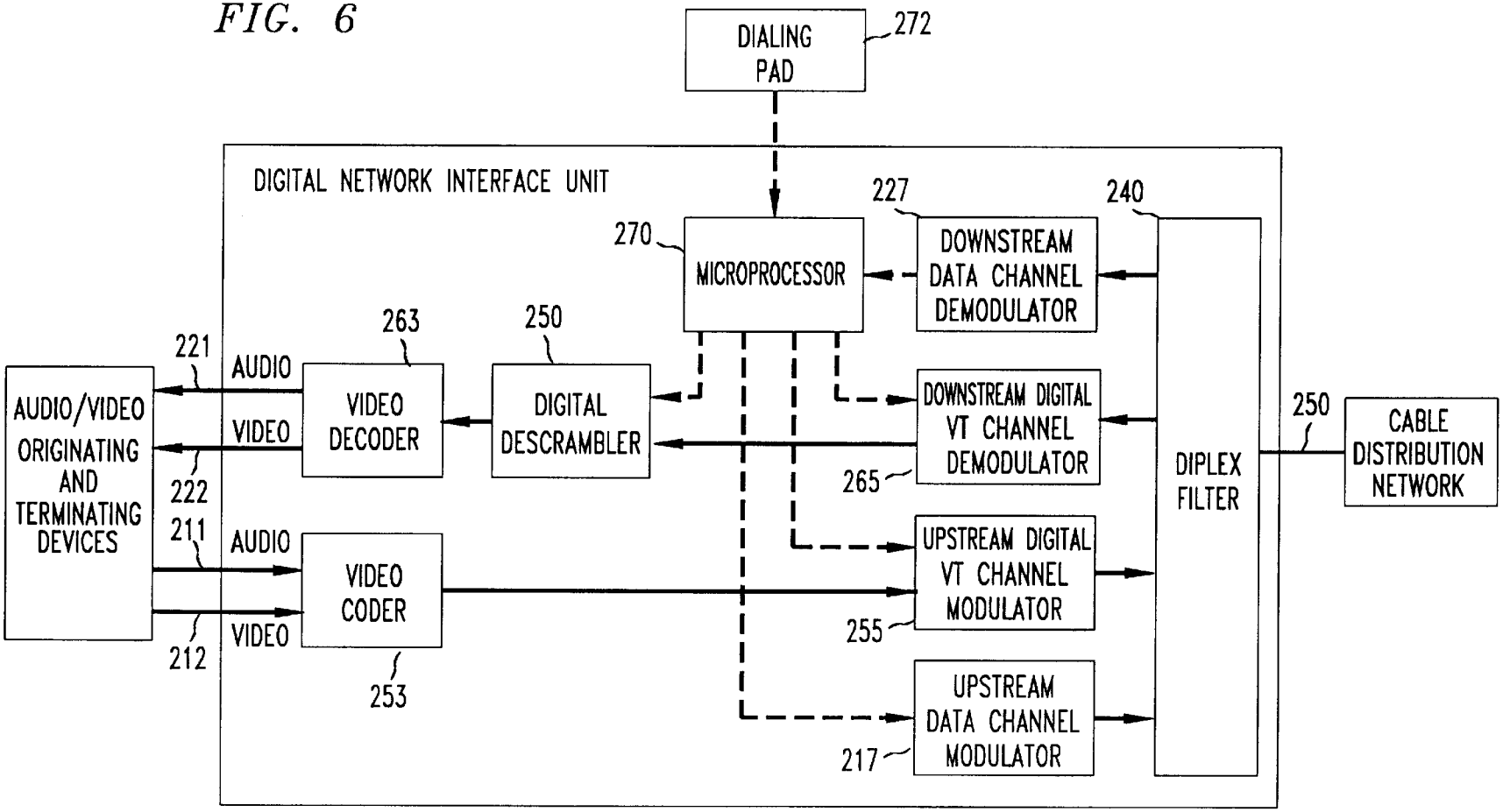
FIG. 6 is a block diagram of a digital network interface unit that can be used in the system of FIG. 1 instead of the analog network interface unit of FIG. 2.

The NIU of FIG. 6, like its counterpart in FIG. 2, includes a microprocessor 270 which receives information from dialing pad 272 and from downstream data channel demodulator 227 and which demodulates the downstream data communication carrier frequency to retrieve control information sent from the VESP. The analog video/audio signals coming from inputs 211 and 212 are first digitally encoded in video coder 253 to form a digital bit stream, which is then modulated in an upstream video telephone channel modulator 255 onto an assigned digital upstream video telephone channel using a carrier frequency that is associated only with that channel. The particular channel center frequency selected and used in modulator 255 is under the control of microprocessor 270, through its interpretation of the upstream video telephone channel assignment message received from the associated head end. Note that two-step modulation (baseband to IF, and IF to channel frequency) is not required in this embodiment.

With respect to downstream signals, incoming digitally encoded video telephone signals are retrieved in the digital NIU of FIG. 6 by demodulating the specific downstream digital video telephone channel in downstream video telephone channel demodulator 265. The particular channel center frequency used in demodulator 265 is selected under the control of microprocessor 270 through its interpretation of the downstream digital video telephone channel assignment message received from the associated head end. In order to assure that only the desired party can receive and utilize the incoming digital audio/video information, the downstream signal is scrambled (in digital scrambler 371 in the destination side VESP, as explained more fully in FIG. 4). Digital descrambler 250 is arranged to descramble the scrambled digital signal output from demodulator 265, under the control of microprocessor 270 through its interpretation of the descrambling authorization message received from the associated head end. The output of descrambler 250 is applied to video decoder 263 which converts the digital signal to audio/video signals in the appropriate format (e.g., NTSC format) for application to the terminating devices, e.g., a television set or monitor. Note that two-step demodulation (i.e., from video telephone channel to IF and from IF to baseband) is not required in this embodiment.

Figure 3:
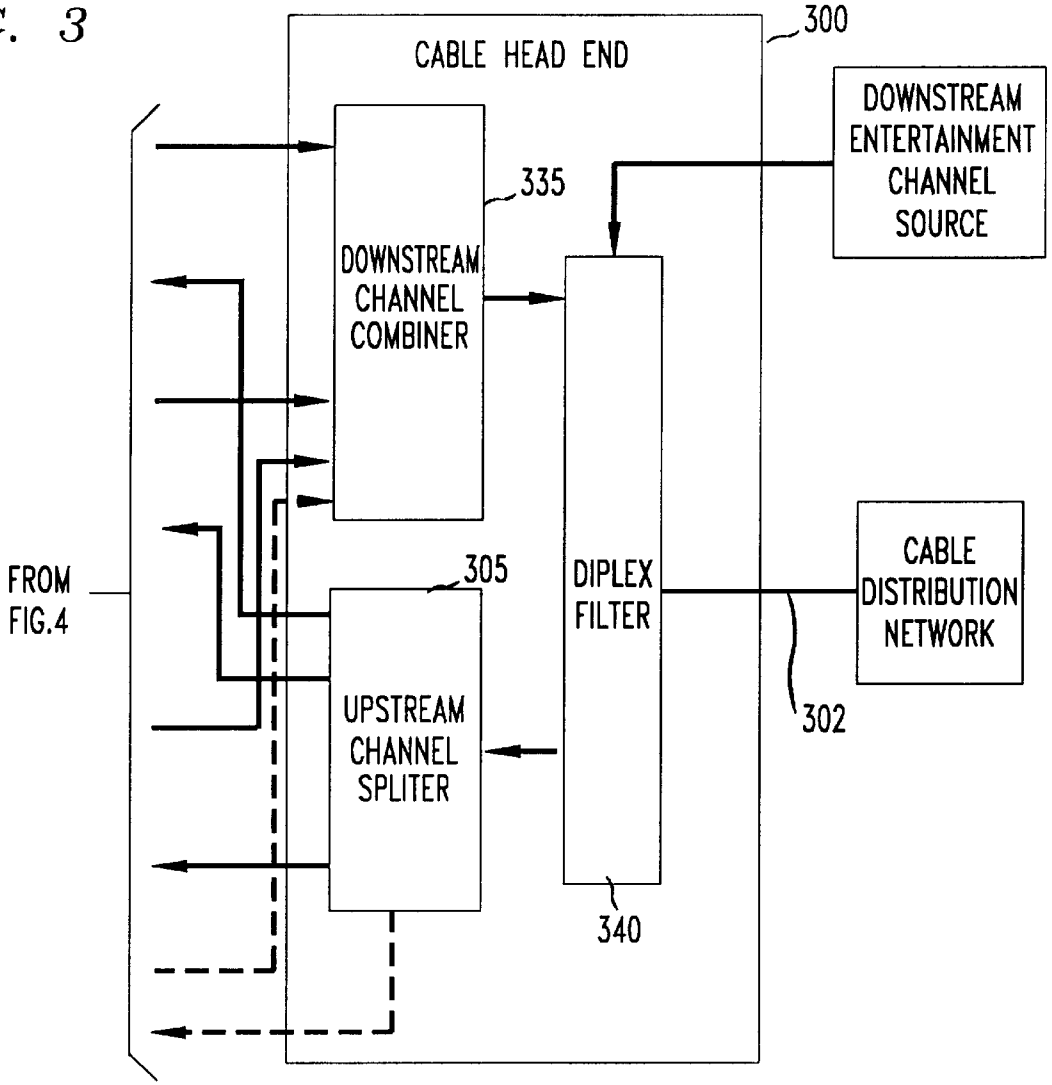
FIG. 3 is a block diagram of a cable head end used in the system of FIG. 1.

FIG. 3 illustrates, in block diagram form, a typical arrangement for cable head ends, such as head ends 124 and 128 of FIG. 1. The function of a cable head end is, in general, to act as signal converter and channel combiner and splitter for the coaxial bandwidth of a cable distribution network.

More specifically, as shown in FIG. 3, a cable head end 300 is arranged to receive RF signals from coaxial cable 302 via a diplex filter 340 similar to filter 240 of FIG. 2, or FIG. 6, which acts like a hybrid and separates incoming and outgoing signal streams, and separates video telephone channel signal streams from entertainment channel signal streams. Signals in the upstream video telephone bandwidth, e.g., 5–30 MHz, are applied to upstream channel splitter 305, which filters and separates the incoming signals on the basis of carrier frequency, and applies the individually modulated RF signals to a plurality of demodulators 307–309, each having the appropriate carrier frequency.

Downstream video telephone signals output from downstream video telephone channel modulators 327–329 in the digital portion of the head end are combined with other entertainment channels, constituting a downstream bandwidth, e.g., 50–550 MHz, in downstream channel combiner 335.

Figure 4:
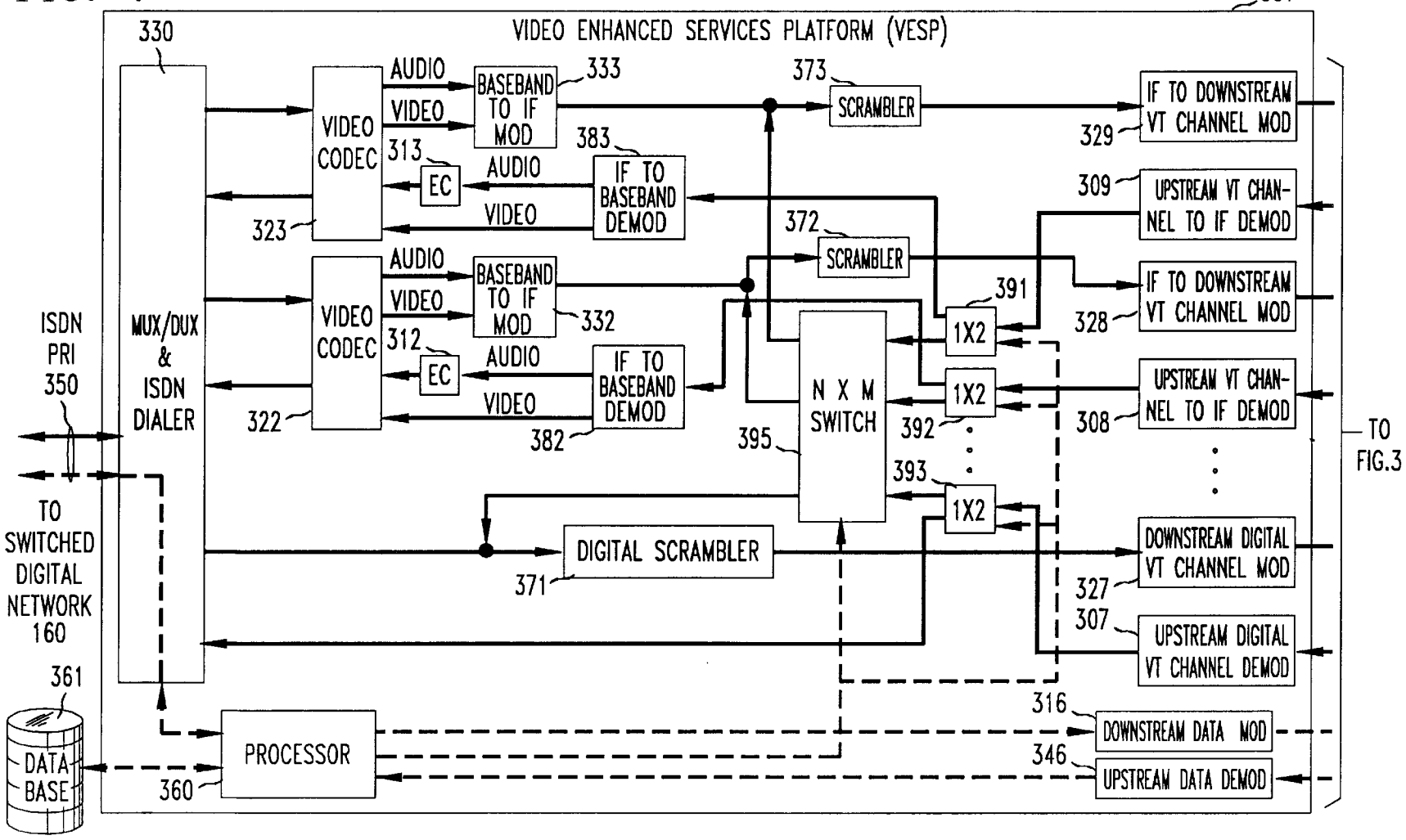
FIG. 4 is a block diagram of a video enhanced services platform (VESP) used in the system of FIG. 1.

FIG. 4 illustrates in block diagram form a typical arrangement for a VESP, such as VESPs 125 and 129 of FIG. 1, which serve as an interface between the cable distribution network and a digital transmission facility such as a T1 or T3 transmission facility operating with the ISDN PRI protocol. In the VESP, upstream analog video telephone channels (two channels being illustrated in FIG. 4) terminate on upstream analog video telephone channel to IF demodulators 308 and 309, while an upstream digital video telephone channel (one channel being illustrated in FIG. 4) terminates on upstream digital video telephone channel demodulator 307.

The output from each upstream video telephone channel demodulator 307–309 feeds into a respective 1×2 switch 391–393. There are two outputs of each of those 1×2 switches. One goes to an input port of an N×M switch 395, where N is the number of incoming analog video telephone channels and M is the number of outgoing video telephone channels. The second output from switches 391 and 392 goes to the IF to baseband demodulator 382 and 383, while the second output from switch 393 goes directly to multiplexer/demultiplexer (MUX/DUX) 330. This different treatment results from the fact that the output of demodulator 307 is digital, and thus does not require IF to baseband demodulation and digital coding, as do the outputs from demodulators 308 and 309, which are analog.

Both 1×2 switches 391–393 and N×M switch 395 receive control instructions from processor 360 which distinguish inter-cable video telephone calls and intra-cable video telephone calls. If, for example, the upstream analog video telephone signal demodulated by demodulator 309 is to be transported to a remote location in another cable distribution system, 1×2 switch 391 will connect its input to IF to baseband demodulator 383. If, in the other case, the upstream analog video telephone signal demodulated by demodulator 309 is to be transmitted to a destination location in the same cable distribution system (intracable video telephone call) via one of the analog downstream video telephone channels, 1×2 switch 391 will connect its input to N×M switch 395. The function of the N×M switch is to connect such an upstream analog video telephone signal directly to one of the downstream analog video telephone channels. For this purpose, the outputs of N×M switch 395 are connected to IF to downstream video telephone channel modulators 328 and 329, via scramblers 372 and 373, which are used so that only the intended destination location can recover and use the transmitted audio/video signals.

With respect to digital (as opposed to analog) signals received in the VESP of FIG. 4, processing of the upstream digital video telephone signal demodulated by demodulator 307 also depends on whether the destination location is connected to the same cable distribution network as the originating location (i.e., an intra-cable system call) or to a different cable distribution network (i.e., an inter-cable system call). If the call is destined for a destination location in another cable distribution system, 1×2 switch 393 connects its input to MUX/DUX 330. If, in the other case, the upstream digital video telephone signal demodulated by demodulator 307 is to be transmitted to a destination location in the same cable distribution system via one of the downstream digital video telephone channels, 1×3 switch 393 connects its input to N×M switch 395. As before, the function of N×M switch 395 is to connect the upstream digital video telephone signal to one of the downstream digital video telephone channels. For security purposes, the downstream digital video telephone signal is scrambled in digital scrambler 371 before being applied to downstream digital video telephone channel modulator 327.

The baseband audio and video signals output from IF to baseband demodulators 382, 383 are essentially similar to the original analog audio and video signals generated in the originating location. However, due to the fact that incoming audio played from the TV set may be picked up by the microphone of the camcorder, echo cancelers 312, 313 may be arranged to eliminate echo in the audio signals, in a manner well known to those skilled in the art. In order to convert the audio and video signals to digital form, the video outputs of demodulators 382, 383 and the audio outputs from echo cancelers 312, 313 are applied to a plurality of codecs 322, 323, which illustratively provide a digital output at 384 Kb/s. Many codecs of this kind are commercially available such as those that are marketed by Compression Labs, Model Rembrandt II/VP. The outputs of codecs 322, 323 and the digital video telephone signals from the upstream digital video telephone channels are combined in a time division multiplexer 330 having ISDN PRI protocol capability. The output of MUX/DUX 330 is applied via digital transmission facility (ISDN PRI) 350 to switched digital network 160.

In the reverse direction, multiplexed composite signals from digital network 160 are received in the VESP of FIG. 4 via digital transmission facility 350. Individual digital signals destined for different destination locations are recovered by demultiplexing in MUX/DUX 330, which performs the demultiplexing function in a manner complementary to the multiplexing function performed on upstream signals, according to the video telephone channel assignment messages generated in the head ends. The demultiplexed bit streams from NWX/DUX 330 are applied to codecs 322, 323 or directly to digital scrambler 371 if the bit streams are destined for locations with video decoding equipment.

The digital signals applied to codecs 322, 323 are first decompressed and then converted back into individual baseband audio and video signals. These assembled outputs are modulated to IF in baseband to EF modulators 332, 333 and then scrambled in scramblers 372, 373, and the scrambled IF signal is then frequency modulated in modulators 328, 329. As stated previously, modulators 328, 329 have different carrier frequencies corresponding to the downstream analog channels on the cable distribution network that are allocated for video telephone calls. The outputs of modulators 327, 329 in the downstream bandwidth (e.g., 50–500 MHz) are combined with the entertainment channels in downstream channel combiner 335 in cable head end 300 and applied to cable 302.

If a demultiplexed digital (rather than analog) signal is destined for a location equipped with video decoding equipment, such a signal need not be converted back to analog form via a codec in the head end. Rather, such a signal is first scrambled by digital scrambler 371 and then modulated to an assigned downstream digital video telephone channel via downstream digital video telephone channel modulator 327.

Because video telephone signals in all downstream channels are applied to all NIUs connected to the cable distribution network 302, the analog scrambling provided in scramblers 372, 373 and the digital scrambling provided in scrambler 371 is necessary for privacy reasons. This assures that the audio/video information can only be used by the particular user for which it is destined because only that user can descramble the signal. For this purpose, only an addressed NIU will receive the descrambling code. An analog NIU will activate its respective analog descrambler 230 and a digital NIU will activate its respective digital descrambler 250 in order to reassemble the received analog or digital audio/video information.

Part of the upstream bandwidth that is split out of the signal received by splitter 305 in the cable head end is a control signal in an upstream data communication channel which is demodulated in an upstream data communication channel demodulator 346 in the VESP. The retrieved upstream control signal is fed into processor 360, and then combined in NWX/DUX 330 with digitized video telephone signals before being transmitted to digital network 160 via transmission facility 350. The functions of processor 360 are (1) to perform polling; (2) to control the N×M switch 395, and the 1×2 switches 391–393; and (3) to control the multiplexer/demultiplexer 330. Local database 361, which operates with processor 360, contains the address and type of all of the NIUs connected by the cable network, and the video telephone channel status. This information is used for polling the NIUS. Downstream data messages from digital network 160 are demultiplexed in multiplexer/demultiplexer 330, and fed into processor 360. These messages, which are used to control subscriber NIUS, are modulated in the downstream data communications channel by modulator 316, and combined with other downstream video telephone channels in downstream channel combiner 335.

Filter 340, together with splitter 305 and combiner 335, operate on analog signals. The distance between the splitter 305 (or combiner 335) and demodulators 307–309 (or modulators 327–329), which are part of the VESP 301, may vary from a few feet to many miles. In the former case, coaxial cables can be used for the connections while, in the latter case, existing off-the-shelf analog fiber optic or microwave transmitters and receivers can be used. While FIGS. 3 and 4 illustrate two analog video telephone channels and one digital video telephone channel, it is to be understood that fewer or more video telephone channels may exist on cable 302, and accordingly, a different number of demodulators and modulators may be employed.

Figure 5:
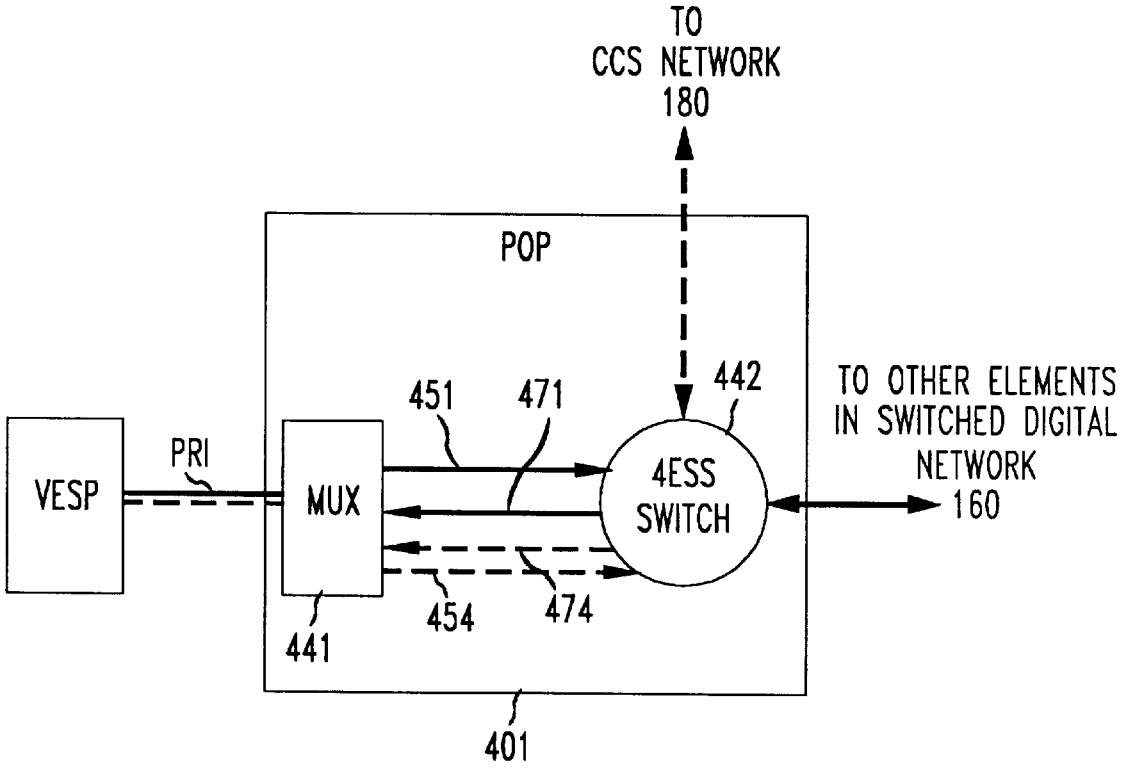
FIG. 5 is a block diagram of point of presence (POP) equipment used in the system of FIG. 1.

Referring now to FIG. 5, there is shown a block diagram illustrating the arrangement of point of presence (POP) equipment 401 which is illustratively used to realize POPs 161 and 162 of FIG. 1 in more detail. POP 401 includes a multiplexer/demultiplexer 441 and an inter-connected digital switch 442 such as an AT&T 4ESS digital switch. Upstream signals, typically in the PRI Q931 protocol, are received in the POP from a VESP and applied to multiplexer/demultiplexer 441. These signals, which include several—illustratively three in FIG. 5—video telephone information signals as well as signaling information, are demultiplexed in multiplexer/demultiplexer 441 to separate signal information from user data. The user data outputs are applied to individual ports of switch 442 for routing to the appropriate destination within digital network 160. Upstream control signals applied to multiplexer/demultiplexer 441 are separately recovered on line 454 by the switch.

If POP 401 in FIG. 5 is the destination for video telephone information signals, switch 442 receives signaling information indicating, for example, the ultimate destination for the call. The incoming video telephone information signal received in switch 442 is coupled to line 47 1, which also connects switch 442 to multiplexer/demultiplexer 441, while the control messages are also passed on a separate line 474. In multiplexer/demultiplexer 441, the individual video telephone information signals from various sources are combined with each other and with control messages relating thereto, and transmitted to the VESP, again typically using PRI Q931 protocol.

The foregoing merely illustrates the invention. Those skilled in the art will be able to devise numerous arrangements which, although not explicitly shown or described herein, embody the principles of the invention and are within their spirit and scope.

We claim:

1. Apparatus for use in a telephone system of a type which comprises a switched telecommunications network, a plurality of voice telephone stations connected to said switched telecommunications network, each of said *voice* telephone stations having an associated local exchange carrier telephone number and said telecommunications network being responsive to receipt, from one of said *voice* telephone stations, of a signal representing the local exchange carrier telephone number of another one of said *voice* telephone stations for establishing a voice communications path between those two *voice* telephone stations, and a plurality of cable subscriber video telephone locations, each connected to said *telecommunications* network via respective cable television distribution network connections, said apparatus comprising

*a* database [means] for storing for each one of said cable subscriber video telephone locations a data record which contains a) the local exchange carrier telephone number associated with a voice telephone station installed at said one cable subscriber *video telephone* location, and b) routing information associated with said one cable subscriber *video telephone* location, said *routing* information specifying a cable television distribution network routing from said switched telecommunications network to said one cable subscriber *video telephone* location, said telecommunications network being responsive to receipt from originating ones of said cable subscriber *video telephone* locations of signals representing the local exchange carrier telephone numbers associated with ones of said voice telephone stations, for accessing said database [means] to retrieve the routing information associated with those *voice telephone* stations and for establishing video telephone connections from said originating cable subscriber *video telephone* locations to respective destination ones of said cable subscriber *video telephone* locations based on the retrieved routing information.

2. The invention of claim 1 wherein said database [means] is a network control point which is accessed within said telecommunications network via common channel signaling paths.

3. A telephone system comprising a switched telecommunications network, a plurality of voice telephone stations connected to said switched telecommunications network, each of said *voice* telephone stations having an associated local exchange carrier telephone number and said telecommunications network being responsive to receipt, from one of said *voice* telephone stations, of a signal representing the local exchange carrier telephone number of another one of said *voice* telephone stations for establishing a communications path between those two *voice* telephone stations, and a plurality of cable subscriber video telephone locations connected to said *telecommunications* network via respective cable television distribution network connections, each of said cable subscriber *video telephone* locations having an associated video telephone number and said telecommunications network being responsive to a signal received from one of said cable subscriber *video telephone* locations representing the video telephone number of another one of said cable subscriber *video telephone* locations for establishing a communications path between those two cable subscriber *video telephone* locations, each one of said cable subscriber video telephone locations having installed thereat a respective one of said voice telephone stations, characterized in that the [said] video telephone number associated with said each one of said cable subscriber video telephone locations is the same as the local exchange carrier telephone number associated with the voice telephone station installed at that one *cable subscriber video telephone* location.

4. A method for use in a telephone system of a type which comprises a switched telecommunications network, a plurality of voice telephone stations connected to said switched telecommunications network, each of said

*voice* telephone stations having an associated local exchange carrier telephone number and said telecommunications network being responsive to a signal received from one of said *voice* telephone stations representing the local exchange carrier telephone number of another one of said *voice* telephone stations for establishing a voice communications path between those two *voice* telephone stations, and a plurality of cable subscriber video telephone locations connected to said *telecommunications* network via respective cable television distribution network connections, said method comprising the steps of storing *in a database* for each one of said cable subscriber video telephone locations a data record which contains a) the local exchange carrier telephone number associated with a voice telephone station installed at said one cable subscriber *video telephone* location, and b) routing information associated with said one cable subscriber *video telephone* location, said *routing* information specifying a cable television distribution network routing from said switched telecommunications network to said one cable subscriber *video telephone* location, accessing said database [means], in response to receipt from originating ones of said cable subscriber *video telephone* locations of signals representing the local exchange carrier telephone numbers associated with ones of said voice telephone stations, to retrieve the routing information associated with those *video telephone* stations, and establishing video telephone connections from said originating cable subscriber *video telephone* locations to respective destination ones of said cable subscriber *video telephone* locations based on the retrieved routing information.

*5. Apparatus for use in a telephone system of a type which comprises*

*a switched telecommunications network,*

*a plurality of voice telephone stations connected to said switched telecommunications network, each of said voice telephone stations having an associated local exchange carrier telephone number and said telecommunications network being responsive to receipt, from one of said voice telephone stations, of a signal representing the local exchange carrier telephone number of another one of said voice telephone stations for establishing a voice communications path between those two voice telephone stations, and*

*a plurality of cable subscriber telephone locations, each connected to said telecommunications network via respective cable television distribution network connections,*

*said apparatus comprising*

*a database for storing for each one of said cable subscriber telephone locations a data record which contains a) the local exchange carrier telephone number associated with a voice telephone station installed at said one cable subscriber telephone location, and, b) routing information associated with said one cable subscriber telephone location, said routing information specifying a cable television distribution network routing from said switched telecommunications network to said one cable subscriber telephone location,*

*said telecommunications network being responsive to receipt from originating ones of said cable subscriber telephone locations of signals representing the local exchange carrier telephone numbers associated with ones of said voice telephone stations, for accessing said database to retrieve the routing information associated with those voice telephone stations and for establishing telephone connections from said originating cable subscriber telephone locations to respective destination ones of said cable subscriber telephone locations based on the retrieved routing information.*

*6. The invention of claim 5 wherein said database is a network control point which is accessed within said telecommunications network via common channel signaling paths.*

*7. A telephone system comprising*

*a switched telecommunications network,*

*a plurality of voice telephone stations connected to said switched telecommunications network, each of said voice telephone stations having an associated local exchange carrier telephone number and said telecommunications network being responsive to receipt, from one of said voice telephone stations, of a signal representing the local exchange carrier telephone number of another one of said voice telephone stations for establishing a communications path between those two voice telephone stations, and*

*a plurality of cable subscriber telephone locations connected to said telecommunications network via respective cable television distribution network connections, each of said cable subscriber telephone locations having an associated telephone number and said telecommunications network being responsive to a signal received from one of said cable subscriber telephone locations representing the telephone number of another one of said cable subscriber telephone locations for establishing a communications path between those two cable subscriber telephone locations, each one of said cable subscriber telephone locations having installed thereat a respective one of said voice telephone stations,*

*characterized in that the telephone number associated with said each one of said cable subscriber telephone locations is the same as the local exchange carrier telephone number associated with the voice telephone station installed at that one cable subscriber telephone location.*

*8. A method for use in a telephone system of a type which comprises*

*a switched telecommunications network,*

*a plurality of voice telephone stations connected to said switched telecommunications network, each of said voice telephone stations having an associated local exchange carrier telephone number and said telecommunications network being responsive to a signal received from one of said voice telephone stations representing the local exchange carrier telephone number of another one of said voice telephone stations for establishing a voice communications path between those two voice telephone stations, and*

*a plurality of cable subscriber telephone locations connected to said telecommunications network via respective cable television distribution network connections,*

*said method comprising the steps of*

*storing in a database for each one of said cable subscriber telephone locations a data record which contains a) the local exchange carrier telephone number associated with a voice telephone station installed at*

*said one cable subscriber telephone location, and b) routing information associated with said one cable subscriber telephone location, said routing information specifying a cable television distribution network routing from said switched telecommunications network to said one cable subscriber telephone location,*

*accessing said database, in response to receipt from originating ones of said cable subscriber telephone locations of signals representing the local exchange carrier telephone numbers associated with ones of said voice telephone stations, to retrieve the routing information associated with those voice telephone stations, and*

*establishing telephone connections from said originating cable subscriber telephone locations to respective destination ones of said cable subscriber telephone locations based on the retrieved routing information.*

* * * * *